(12) United States Patent
Montaser et al.

(10) Patent No.: US 7,483,767 B2
(45) Date of Patent: Jan. 27, 2009

(54) FEEDBACK MECHANISM FOR SMART NOZZLES AND NEBULIZERS

(75) Inventors: Akbar Montaser, Potomac, MD (US); Kaveh Jorabchi, Arlington, VA (US); Kaveh Kahen, Kleinburg (CA)

(73) Assignee: The George Washington University, Washington, DC (US)

( * ) Notice: Subject to any disclaimer, the term of this patent is extended or adjusted under 35 U.S.C. 154(b) by 286 days.

(21) Appl. No.: 11/247,596

(22) Filed: Oct. 12, 2005

(65) Prior Publication Data

US 2007/0299561 A1    Dec. 27, 2007

Related U.S. Application Data

(60) Provisional application No. 60/618,261, filed on Oct. 14, 2004.

(51) Int. Cl.
    *G05D 11/00* (2006.01)
(52) U.S. Cl. .................................... 700/283
(58) Field of Classification Search ............ 700/28, 700/32, 45, 173, 174, 283, 73
    See application file for complete search history.

(56) References Cited

U.S. PATENT DOCUMENTS

| | | | |
|---|---|---|---|
| 4,533,082 A * | 8/1985 | Maehara et al. | 239/102.2 |
| 6,744,046 B2 * | 6/2004 | Valaskovic et al. | 250/288 |
| 6,854,662 B2 * | 2/2005 | Chen | 239/102.2 |
| 6,967,304 B2 * | 11/2005 | Gevelber et al. | 219/121.47 |
| 2004/0256487 A1 * | 12/2004 | Collins et al. | 239/338 |

OTHER PUBLICATIONS

Marran et al.; "Intracavity Technique for Improved Raman/Rayleigh Imaging in Flames"; Apr. 1, 1995; Optices Letters; vol. 20; No. 7; pp. 791-793.*
Rottenkilber et al. ; "Combined "Fluoresence" LDV(FLDV) and PDA Technique for Non-ambigous Two Phase Measuremnts Inside the Spray of a Sl-Engine"; Jul. 27, 2001; pp. 216-225.*
Macedone et al.; "Factors affecting analyte Transport Through the Sampling Orifice of an Inductively Coupled Plasma Mass Spectrometer"; 2001; Elsevier; pp. 1687-1695.*
Llberzon et al.; "XPIV-Multi-Plane Stereoscopic Particle Image Velocimetry"; Dec. 5, 2003; Experiments in Fluids 36, pp. 355-362.*

* cited by examiner

*Primary Examiner*—Albert DeCady
*Assistant Examiner*—Chad Rapp
(74) *Attorney, Agent, or Firm*—Roylance, Abrams, Berdo & Goodman, L.L.P.

(57) ABSTRACT

Nozzles and nebulizers able to produce aerosol with optimum and reproducible quality based on feedback information obtained using laser imaging techniques. Two laser-based imaging techniques based on particle image velocimetry (PTV) and optical patternation map and contrast size and velocity distributions for indirect and direct pneumatic nebulizations in plasma spectrometry. Two pulses from thin laser sheet with known time difference illuminate droplets flow field. Charge coupled device (CCL)) captures scattering of laser light from droplets, providing two instantaneous particle images. Pointwise cross-correlation of corresponding images yields two-dimensional velocity map of aerosol velocity field. For droplet size distribution studies, solution is doped with fluorescent dye and both laser induced florescence (LIF) and Mie scattering images are captured simultaneously by two CCDs with the same field of view. Ratio of LIF/Mie images provides relative droplet size information, then scaled by point calibration method via phase Doppler particle analyzer.

34 Claims, 7 Drawing Sheets

US 7,483,767 B2

FEEDBACK MECHANISM FOR SMART NOZZLES AND NEBULIZERS

CROSS REFERENCE TO A RELATED APPLICATION

Figure 1:
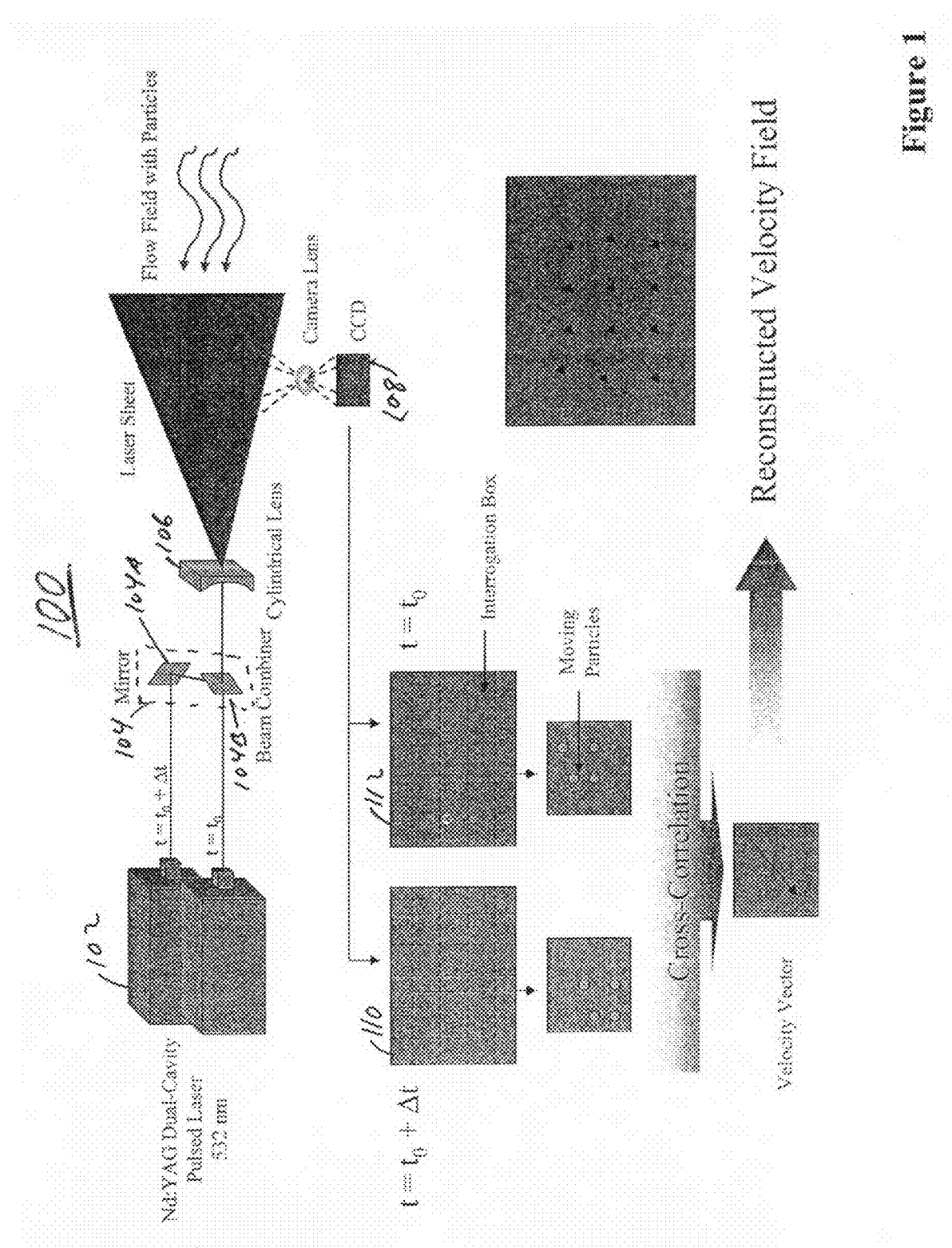
Figure 2:
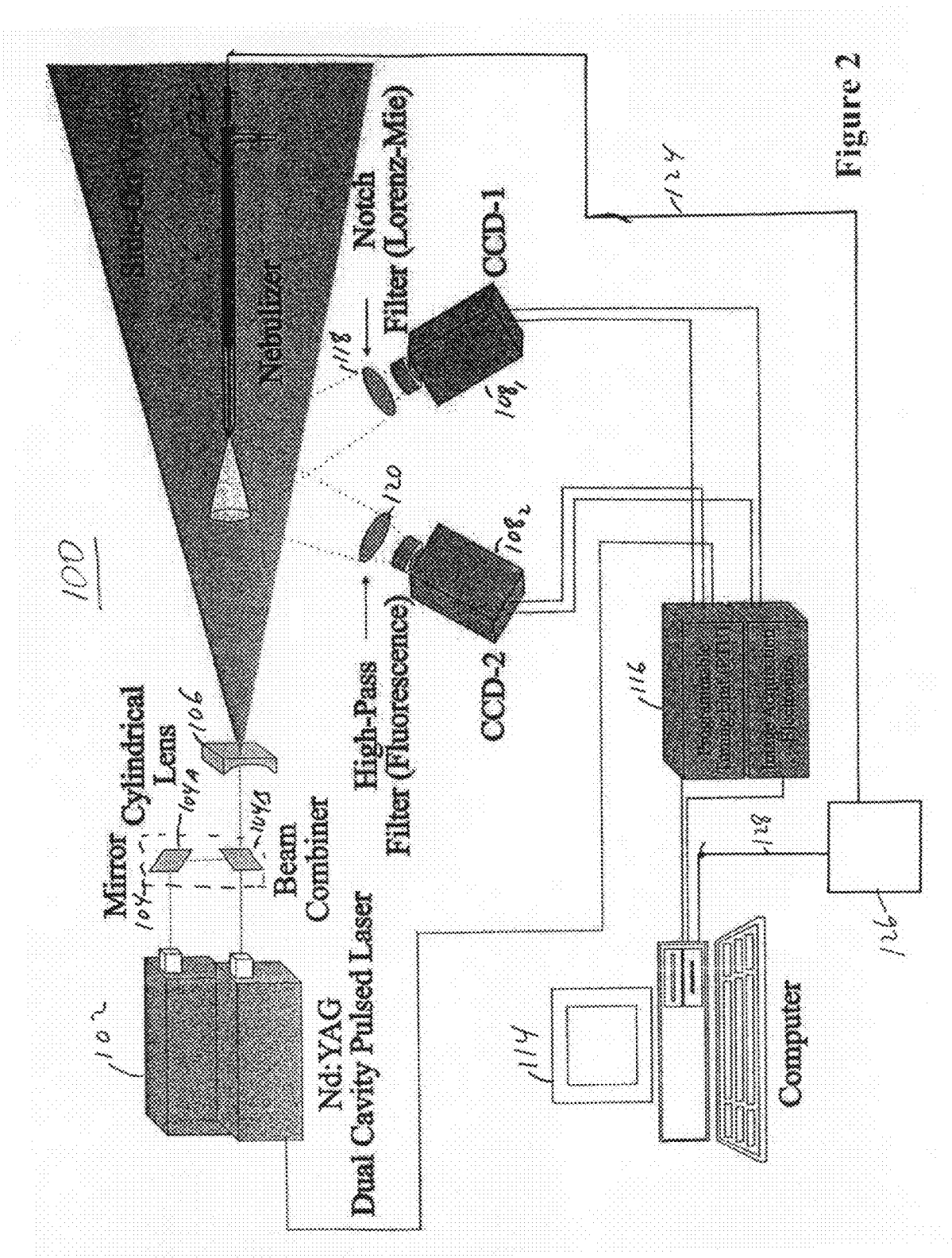

Related Subject matter is disclosed in U.S. Pat. No. 6,166,379, entitled "Direct Injection High Efficiency Nebulizer For Analytical Spectrometry", Issued on Dec. 26, 2000 to Akbar Montaser et al. This application claims benefit under 35 U.S.C. §119(e) of provisional patent application Ser. No. 60/618,261, filed on Oct. 14, 2004. The entire disclosures of said patent and provisional application are hereby incorporated by reference.

This application was made with United States Government support under Grant No. DE-FG02-93ER14320 awarded by the U.S. Department of Energy and under Grant Nos. CHE-9505726 and CHE-9512441 awarded by the National Science Foundation. The U.S. Government has certain rights in the invention.

BACKGROUND OF THE INVENTION

1. Field of the Invention

The present invention relates generally to nebulizers and nozzles for use in analytical spectrometry and fuel spray technology (for example, fuel injector systems, inhalers, and the like). More specifically the present invention relates to smart nozzles and nebulizers that can be adjusted to produce an aerosol with optimum and reproducible quality based on the feedback information provided by a laser imaging technique. (Throughout the specification the terms "droplets", "aerosol" and "particles" may be used interchangeably.)

2. Description of the Related Art

In flame and plasma spectrometry, test solutions are typically introduced into the flame or plasma in the form of a liquid aerosol. The bulk liquid is first converted to a spray, usually by means of a pneumatic nebulizer. The aerosol is then conditioned by removing the larger droplets with a spray chamber before introduction to the plasma. The spray chamber suffers from large memory effects, signal broadening during chromatographic separations, volatile analyte loss, and transient acid effects. Alternatively, direct sample introduction can eliminate such shortcomings. Nevertheless, the quality of the aerosol produced, for example by inductively coupled plasma (ICP) nebulizers, greatly affects the analytical performance of the technique in both direct and indirect sample introduction. For example, the properties of sprays affect the performance of combustion devices in jet engines, drug delivery from dose inhalers, and distribution of chemical supplements in agricultural applications.

Introduction of samples into the plasma remains the main problem in inductively coupled plasma mass spectrometry (ICPMS)[1] and atomic emission spectroscopy (ICPAES)[2] despite recent improvements in the analytical performance indices.[3-9] Aerosol characterization and nebulizer diagnostics offer valuable information on the fundamental aspects of sample introduction in plasma spectrometries and confirm models for aerosol generation and transport.[10-16] Droplet size and velocity distributions are the most important factors that determine the quality of an aerosol. Small and monodisperse droplets, with low and uniform velocity, must be introduced into the central channel of the plasma for efficient desolvation, vaporization, atomization, excitation, and ionization of the sample.[17-21]

Various techniques have been utilized for the determination of average size and size distribution of the droplets produced by ICP nebulizers, with the optical approaches being preferred to mechanical methods because of their non-intrusive nature and greater accuracy.[4,5,22] Lorenz-Mie scattering,[23] phase-Doppler particle analysis (PDPA),[5,17,19] and laser Fraunhofer diffraction[24-28] are among the most popular optical techniques for droplet size measurements in ICP nebulizers. A recent method introduces a novel aerosol diagnostics technique, which unlike point measurement methods, provides spatially-resolved three-dimensional (3-D) particle size and mass distributions for ICP nebulizers by acquiring 2-D maps at several distances from the nozzle.[29,30]

Among cited techniques, only PDPA measures the velocity of the droplets at points within the spray field. Importantly, except for a few reports,[17,19,31-33] no in-depth study has been published on the velocity distribution of the aerosol produced by ICP nebulizers. Nevertheless, the velocity of droplets is one of the most important factors in the desolvation, vaporization, atomization, excitation, and ionization of the analyte. High velocity droplets experience shorter residence times and consequently less particle-plasma interaction compared to slow droplets. Furthermore, the studies conducted so far have provided only single-point measurements.

SUMMARY OF THE INVENTION

Accordingly, certain embodiments of the present invention address the above-mentioned problems occurring in the prior art, and it is an object of embodiments of the present invention to provide smart and tunable nozzles or a nebulizer. Embodiments of the present invention provide an automated response circuit, which measures quantitative properties of the droplets such as size and velocity as inputs, which may be a feedback signal, to produce a more optimum aerosol through adjustment of the operating conditions and/or the critical dimensions of the nozzle or nebulizer. An optimum aerosol comprises droplets having minimum size and velocity, that is, the least momentum. Small and slow droplets, for example, completely desolvate, vaporize, atomize, and ionize in the ICP, enhancing signal level, precision, and the accuracy of analytical measurements It is another object of embodiments of the present invention to provide an apparatus and method for measuring droplet velocity and size using two laser-based imaging techniques based on Particle Image Velocimetry (PIV) and optical patternation. Other measurement techniques such as a phase Doppler particle analyzer (PDPA), also may be applied to provide the feedback signal. It should be noted that the exemplary implementations of the present invention may also be combined with other control tools such as, for example, using a signal from a viscometer, which is used to measure resistance to flow, as a feedback signal.

Particle image velocimetry (PIV)[34-37] is applied to probe the 2-D velocity field of aerosol from several nebulization systems. The approach, with minor modifications, also provides the size and mass distribution of droplets by utilizing concepts governing optical patternation. Size and velocity distribution of arrangement is then characterized and contrasted. According to an embodiment of the present invention, PIV is applied for constructing a 2-D map of velocity field by nebulization systems used in ICP spectrometry.

According to an implementation of the present invention, the results are based on ICP nebulizers in the absence of a plasma. The reduced density of the droplets inside the ICP due to intense evaporation hinders the PIV analysis. Instead, particle tracking velocimetry (PTV) is used to calculate the velocity of the droplets.

According to an implementation of the present invention, particle image velocimetry was applied to obtain the two-dimensional velocity map and spray structure of the droplets produced by several ICP nebulization systems. The setup, with minor modifications, was applied to instantaneously acquire a spatially resolved map of droplet sizes. The presence of large and slow droplets on the fringes of the aerosol cone supports theoretical findings on droplet coalescence.

The study of the tertiary aerosol revealed that the ICP spray chamber is not only a droplet size filter, but a velocity filter as well, i.e., the spray chamber is a momentum separator. The aerosol emerging from the spray chamber/torch injector tube is confined within a narrow channel, comprising droplets with relatively uniform size and velocity distributions, which unlike large and fast droplets in the primary aerosol, would contribute to a signal in ICP spectrometries.

The plasma and flame spectrometries are used in a wide range of applications involving analysis of samples from diverse fields such as semiconductor industry, energy generation, materials science, forensic chemistry, nuclear chemistry, environmental pollution, nutrition, biomedicine, and pharmacology. The field of ICP spectrometry in particular has revolutionized simultaneous elemental determinations at the trace, minor, and major constituent levels. Because physical properties of different samples can be exceedingly dissimilar, according to an embodiment of the present invention, optimization of nebulizer operating parameters and elimination of the noise sources can improve the accuracy and precision of the measurements and minimizes the human errors.

According to other exemplary implementations of the present invention, a concept of a smart nozzle or nebulizer may be applied in plasma spectrometry or in other fields relating to liquid atomizers as used in automotive industry or dose inhaler. Conventionally, optimum operating conditions are achieved by manually adjusting the gas and liquid flow rates and using the analyte signal intensity as the optimization criterion. According to an implementation of the present invention, a smart nozzle or nebulizer produces the finest possible aerosol, thereby increasing the efficiency of sample introduction. Certain embodiments of the present invention, as applied to fuel injectors, also have the potential to maximize the gasoline consumption efficiency in an automobile engine. The potential also exist for adjusting the device operating parameters and critical dimensions when the sample property and/or sample size is changed to produce the same quality aerosol and reduce matrix effects. According to an implementation of the present invention, a smart nozzle or nebulizer is easy to operate, and does not require the supervision of the operator, thus eliminating human errors and also saving human resources.

According to an implementation of the present invention, the smart nozzle or nebulizer is well suited for any ICP applications where the analysis demands low sample requirements, reduced memory effects, high sensitivity, improved precision, and low limits of detection.

Certain implementation of the present invention can also be used in the automobile industry to design self-tuning engines for optimum fuel consumption efficiency.

In the age of "green" chemistry, a smart nebulizer, according to an implementation of the present invention, can provide means to reduce the amount of waste generated. With improved performance of the nozzle or nebulizer at lower solution uptake rates, a smart device may be obtained which can diminish both sample and solvent consumption. This is particularly applicable when either expensive or environmentally unfriendly solvents have to be used.

BRIEF DESCRIPTION OF THE DRAWINGS

The above aspects and features will be more apparent by describing certain embodiments of the present invention with reference to the accompanying drawings, in which:

FIG. 1 is a schematic diagram illustrating the principles of particle image velocimetry (PIV) where a dual-cavity laser and a charge coupled device (CCD) are used to capture two consecutive images for constructing the velocity field in accordance with an embodiment of the present invention;

FIG. 2 is a diagram illustrating an example of an experimental arrangement for the PIV/optical patternation instrument where the setup is used with either one or two CCDs for velocity or size measurements, respectively, in accordance with an embodiment of the present invention;

FIG. 3 is an image illustrating an example of a two-dimensional velocity map of the aerosol produced by a direct injection high efficiency nebulizer (DIHEN) at a nebulizer gas flow rate of 0.2 L/min and a solution uptake rate of 85 μL/min in accordance with an embodiment of the present invention;

FIGS. 4A to 4D are images illustrating velocity profiles in the x direction for: (A) DIHEN at a nebulizer gas flow rate of 0.12 L/min and a solution uptake rate of 85 μL/min; (B) large bore (LB)-DIHEN at a nebulizer gas flow rate of 0.3 L/min and a solution uptake rate of 85 μL/min; (C) PFA and (D) PFA-spray chamber aerosol at a nebulizer gas flow rate of 0.9 L/min and a nominal natural aspiration rate of 100 μL/min in accordance with an embodiment of the present invention;

FIGS. 5A to 5D are images of a Sauter mean diameter distribution of the aerosol for: (A) DIHEN at a nebulizer gas flow rate of 0.12 L/min and a solution uptake rate of 85 μL/min; (B) LB-DIHEN at a nebulizer gas flow rate of 0.3 L/min and a solution uptake rate of 85 μL/min; (C and D) PFA primary and tertiary aerosol, respectively, at a nebulizer gas flow rate of 0.9 L/min and a nominal natural aspiration rate of 100 μL/min in accordance with an embodiment of the present invention;

FIGS. 6A to 6F are images of a Sauter mean diameter distribution (A, C, E) and velocity profiles (B, D, F) for the DIHEN aerosol under various operating conditions: (A and B) a nebulizer gas flow rate of 0.12 L/min and a solution uptake rate of 85 μL/min; (C and D) a nebulizer gas flow rate of 0.2 L/min and a solution uptake rate of 85 μL/min; (E and D) at a nebulizer gas flow rate of 0.2 L/min and a solution uptake rate of 10 μL/min in accordance with an embodiment of the present invention; and FIG. 7 is an image of a two-dimensional $D_{3,2}$ map of the methanol aerosol produced by the DIHEN at a nebulizer gas flow rate of 0.12 L/min and a solution uptake rate of 10 μL/min in accordance with an embodiment of the present invention.

DETAILED DESCRIPTION OF EXEMPLARY EMBODIMENTS

Certain principles of particle image velocimetry (PIV) according to an embodiment of the present invention are illustrated in FIG. 1. The exemplary monitoring system 100 of FIG. 1 comprises a dual cavity frequency-doubled Nd:YAG pulsed laser 102 and a set of cylindrical lenses 104 comprising mirrors 104A and a cylindrical lens 104B, and a cylindrical lens 106 in order to generate a laser sheet. A charge coupled detector (CCD) 108 is used to record the scattering of the laser light.

In an embodiment of the present invention, a velocity of an ensemble of particles or droplets is determined, providing a suitable means to study high-density flow fields where the individual particles are difficult to distinguish and track.[38-40] The flow field of droplets is illuminated by two pulses of a thin laser sheet, having a defined time difference of Δt. The scattering of the laser light from droplets is recorded with the CCD 108, resulting in two instantaneous images of the moving particles. The two images are then divided into subsections of m×n pixels, known as interrogation boxes 110 and 112. To calculate the 2-D velocity vector, the average displacement of the particles is assessed via cross-correlation of the corresponding interrogation boxes 110 and 112 in two images.[41] The cross-correlation function (Rfg) is defined as:

$$R_{fg}(i, j) = f(i, j) \otimes g(i, j) = \sum_{x=0}^{m-1}\sum_{y=0}^{n-1} f(x, y)g(x-i, y-j) \quad (1)$$

where f and g are the functions corresponding to the interrogation boxes 110 and 112. In cross-correlation, g is shifted i and j pixels in the x and y directions, respectively. The extent of the overlap between the resulting function and f determines the value of the cross-correlation function Rfg (i,j). Therefore, the position of the maximum in Rfg (i,j) provides the displacement vector during Δt, resulting in the velocity vector for the particular interrogation box. The extensive mathematical operations in cross-correlation necessitate the use of computers and the like, using Fourier transform operations to simplify the calculations. The velocity profile of the flow field is reconstructed from individual velocity vectors for interrogation boxes across the field. According to an exemplary implementation, a reconstruction is obtained when the neighboring interrogation boxes are defined with a 50% area overlap.[41]

According to an exemplary embodiment of the present invention, detection of the maximum R (i,j) plays a role in the accuracy of the PIV measurements. Occurrence of local maxima introduces uncertainty in the detection of the correct maximum and the calculation of accurate velocity fields. Accordingly, the ratio of the largest peak to the second largest peak in the cross-correlation function represents the signal-to-noise ratio (SNR). According to an exemplary implementation of the present invention, to obtain more accurate results, more than 20 particles should exist in the interrogation box, and the particles should move within less than 30% of the box between the two pulses of the laser.[42]

In an embodiment of the present invention, a 3-D velocity field may be obtained by using two cameras positioned at an angle with respect to each other covering the exact same field of view through careful calibration. In this configuration, the z component of the velocity vector (perpendicular to the laser sheet) is reconstructed from the two 2-D velocity fields observed by two cameras and the x and y components.

Optical patternation is known in the art. Thus a detailed description will be omitted for conciseness. Briefly, in optical patternation, a thin laser sheet illuminates the aerosol flow field to measure Lorenz-Mie scattered light and the fluorescence intensity from the droplets. The test solution is doped with a dye that fluoresces at longer wavelengths that are distinguishable from radiations originating from the scattered beam. The fluorescence intensity is a function of the incident laser beam intensity, number of droplets, concentration of the fluorescent molecules and the mass of droplets, expressed in terms of volume or $d^3$ (d is the droplet diameter). Droplets also scatter the incident laser beam, with Lorenz-Mie scattered light intensity being proportional to $d^2$.[43] The Sauter mean diameter ($D_{3,2}$), defined as the ratio of cumulative droplet volume to the cumulative surface area of the droplets, is obtained from:

$$D_{3,2} = \frac{\sum_{i=1}^{NC} n_i d_i^3}{\sum_{i=1}^{NC} n_i d_i^2} \quad (2)$$

where $n_i$ is the number of droplets for each size class and NC represents the total number of droplet size classes. A $D_{3,2}$ map of the droplets may be acquired by dividing the 2-D fluorescence image by the elastic light scattering image:

$$D_{3,2}(x,y)=k \cdot I_f(x,y)/I_e(x,y) \quad (3)$$

where k is a constant, If (x,y) is the fluorescence intensity at point (x,y), and Ie(x,y) is the elastic light scattering intensity. The value of k is obtained by using an independent point-sizing technique such as a phase Doppler particle analyzer (PDPA) to empirically determine $D_{3,2}$ at several points.[29] While k is generally considered independent from the droplet size and size distribution, significant deviations are reported for small monodisperse droplets, resulting in up to a 30% error in $D_{3,2}$ measurements.[44] In an exemplary implementation of the present invention, aerosols studied are polydisperse for which the error in $D_{3,2}$ is relatively small (maximum 10%).

A schematic diagram of the instrument (SprayMaster System, LaVision Inc., Ypsilanti, Mich.) according to an exemplary implementation of the present invention is presented in FIG. 2. The system comprises two major components: 1) a dual cavity frequency-doubled Nd:YAG laser 102, for example, a 120 mJ/pulse, 5-ns pulse duration. 532 nm, 15 Hz repetition rate, (New Wave Research Inc., Fremont, Calif.) and a set of mirrors 104 and cylindrical lenses 106 used to generate a laser sheet of 1-mm thickness; this configuration allows the adjustment of Δt in PIV measurements from ns to ms; and 2) two imager intensified cross-correlation CCDs $\mathbf{108}_1$ and $\mathbf{108}_2$, for example, 1376×1040 pixels and 10 frames/sec rate, (LaVision Inc.) equipped with 60-mm focal length lenses (Micro Nikkor, Nikon). The laser and the cameras are controlled and synchronized, for example, via DaVis software (Version 6.2, LaVision Inc.) and the like on a personal computer 114 using a programmable timing unit (PTU) and Image Acquisition Electronics 116. Two parallel processors (1-GHz, P4) allow for fast data-processing and extensive image correlation calculations. However, those skilled in the art will appreciate that the implementations of the present invention are not limited to dual processors.

A feedback line 128, a controller 126 and a control line 124 are connected to the nebulizer or injector 122. The feedback line 128 connected between the computer 114 and the controller 126 represents momentum, which is defined as mass x velocity. That is, the amount of aerosol is monitored via the system 100. The feedback from the nebulizer 122 via feedback line 128, controller 126 and control line 124 may be used to control the critical dimensions of nebulizer 122 such as the gas flow rate and the nebulizer tip. According to an exemplary embodiment of the present invention, the controller 126 may be integrated into the computer 114.

According to an exemplary embodiment of the present invention, for dropsizing measurements, one camera $\mathbf{108}_1$ is equipped with a narrow band-pass filter 118, for example, 532±10 nm, (Lot Oriel GmbH & Co. KG, Darmstadt, Germany) to record the Mie scattering image. A second camera $\mathbf{108}_2$ simultaneously captures the fluorescence image through a high-pass filter 120, for example, (OG570, Bes Optics Inc., W. Warwick, R. I.). Calibration of the cameras is performed to ensure the maximum overlap of the field of view for both cameras, and correlation of the pixels in two cameras corresponding to a single point in the field of view. The $D_{3,2}$ maps are calculated from an average image resulting from 100 pairs of laser induced florescence (LIF) and Mie images. This arrangement offers four advantages over the system used in previous optical patternation studies.[29,30] First, simultaneous imaging of aerosol (LIF and Mie) increases the accuracy of the $D_{3,2}$ measurements as opposed to capturing each image at separate times because the structure of the spray changes during this period. Second, simultaneous measurements eliminate the possibility of altering the field of view of the camera when the filters are replaced. Third, the use of a pulsed higher-power laser reduces the signal attenuation by secondary scattering in the spray.[45] Fourth, a high resolution CCD provides a detailed structure of the aerosol.

Two-dimensional velocity fields are measured through Mie scattering using a single CCD. The camera is positioned perpendicular to the laser sheet, covering a field of view of approximately 3 cm×2 cm. Two consecutive images, recorded with a $\Delta t=5$ µs, are divided into 32×32 pixel interrogation areas. Cross-correlation of the corresponding interrogation areas is performed to provide the instantaneous velocity field of the flow. Finally, 100 instantaneous velocity fields are averaged to obtain the mean velocity field without further vector post-processing operations. Velocity contours are generated by extracting the data from the DaVis software to a data analysis software (Microcal™ Origin®, Version 6, Northampton, Mass.).

According to an exemplary embodiment of the present invention, the flow field of droplets by two pulses from a thin laser sheet with a known time difference is illuminated. The scattering of the laser light from droplets is captured by a CCD 108, providing two instantaneous images of the particles. Pointwise cross-correlation of the corresponding images yields a two-dimensional (2-D) velocity map of the aerosol velocity field. For droplet size distribution studies, the solution is doped with a fluorescent dye and LIF and Mie scattering images are captured simultaneously by two CCDs 108$_1$ and 108$_2$ with the same field of view. The ratio of the LIF/Mie images provides relative droplet size information, which is then scaled by a point calibration method via a PDPA. Multiplying the 2-D aerosol size map with the 2-D velocity map results in a 2-D image, representative of aerosol momentum.

The 2-D momentum map of the aerosol is used as the optimization criterion to adjust the operating parameters and/or critical dimensions of the nebulizer. The minimum momentum value corresponds to an aerosol of the best quality. Current conventional nebulizers are made of rigid material, such as glass and Teflon, thus it is not possible to modify their critical dimensions, such as capillary i.d. and gas annulus area. According to an exemplary embodiment of the present invention, a capillary of the smart nebulizer can be made of, for example, piezoelectric ceramic whose dimensions change once a voltage is applied to the capillary.

For calibration purposes, a 2-D PDPA (Aerometrics/TSI Inc., St. Paul, Minn.) is used to determine $D_{3,2}$ of the aerosol. An in-depth description of the PDPA system is presented elsewhere.[17,19,31] The instrument comprises a 300-mW argon ion laser (Model 5500A-00, Ion Laser Technologies, Salt Lake City, Utah), and a detector unit with three photomultiplier tubes (Model RSA1000-P, Aerometrics/TSI Inc.). The forward scattering angle between the receiver (Model RCV2208, Aerometrics/TSI Inc.) and the transmitter (Model XMT204-2.1, Aerometrics/TSI Inc.) is adjusted to 30°. It should be noted that the PDPA works better on small droplets if a 40° off-axis forward scattering detection is used, rather than 30°.[46] The nebulizer is placed horizontally to replicate the arrangement in ICPMS, with the probe volume (~120 µm wide) focused at 15 mm from the nebulizer tip to prevent multiple scattering near the tip area. Approximately 10,000 droplets are measured at each run to determine the $D_{3,2}$ values from the aerosol size distribution. The precision of the $D_{3,2}$ values ranges from 0.5 to 2% relative standard deviation for 3 consecutive measurements.

Certain exemplary implementation of the present invention are described with reference to experimental results as follows. Three nebulization systems are tested: (1) a direct injection high efficiency nebulizer[31,47] (Model DIHEN-170-AA, Meinhard Glass Products, Analytical Reference Materials International Corp., Golden, Colo.); (2) a large bore-DIHEN[32] (Model LB-DIHEN-30-AA, Meinhard Glass Products); and (3) a PFA fixed-capillary microflow nebulizer (Model PFA-100, Elemental Scientific, Inc., Omaha, Nebr.) with a PFA Scott-type spray chamber (Model PureChamber, Elemental Scientific, Inc.). The primary aerosol for the nebulizers plus the tertiary aerosol for the PFA-spray chamber arrangement are investigated. The nebulizer gas flow rate, controlled by a mass flow controller (Model 8200, Matheson Gas Products, East Rutherford, N.J.), is 0.12 (or 0.2), 0.3, and 0.9 L/min for the DIHEN, LB-DIHEN and PFA, respectively. The test solution is delivered to the DIHEN and LB-DIHEN at 85 µL/min (unless otherwise indicated) using a syringe pump (Model KDS100, KD Scientific, New Hope, Pa.) and PEEK pump tubing (0.010 in. i.d.; Upchurch Scientific, Oak Harbor, Wash.). For the PFA nebulizer, the test solution is naturally aspirated at 100 µL/min at a nebulizer gas flow rate of 0.9 L/min. Distilled-deionized water of 18 MΩ-cm resistivity is used for the PIV measurements. For drop-sizing experiments, a 10-mg/L solution of Rhodamine 6G (Sigma-Aldrich, St. Louis, Mo.) in distilled-deionized water is prepared as a fluorescent dye. It should be noted that Rhodamine 6G is a suspected carcinogenic substance and operating with it requires safety glasses and adequate ventilation.

Figure 3:
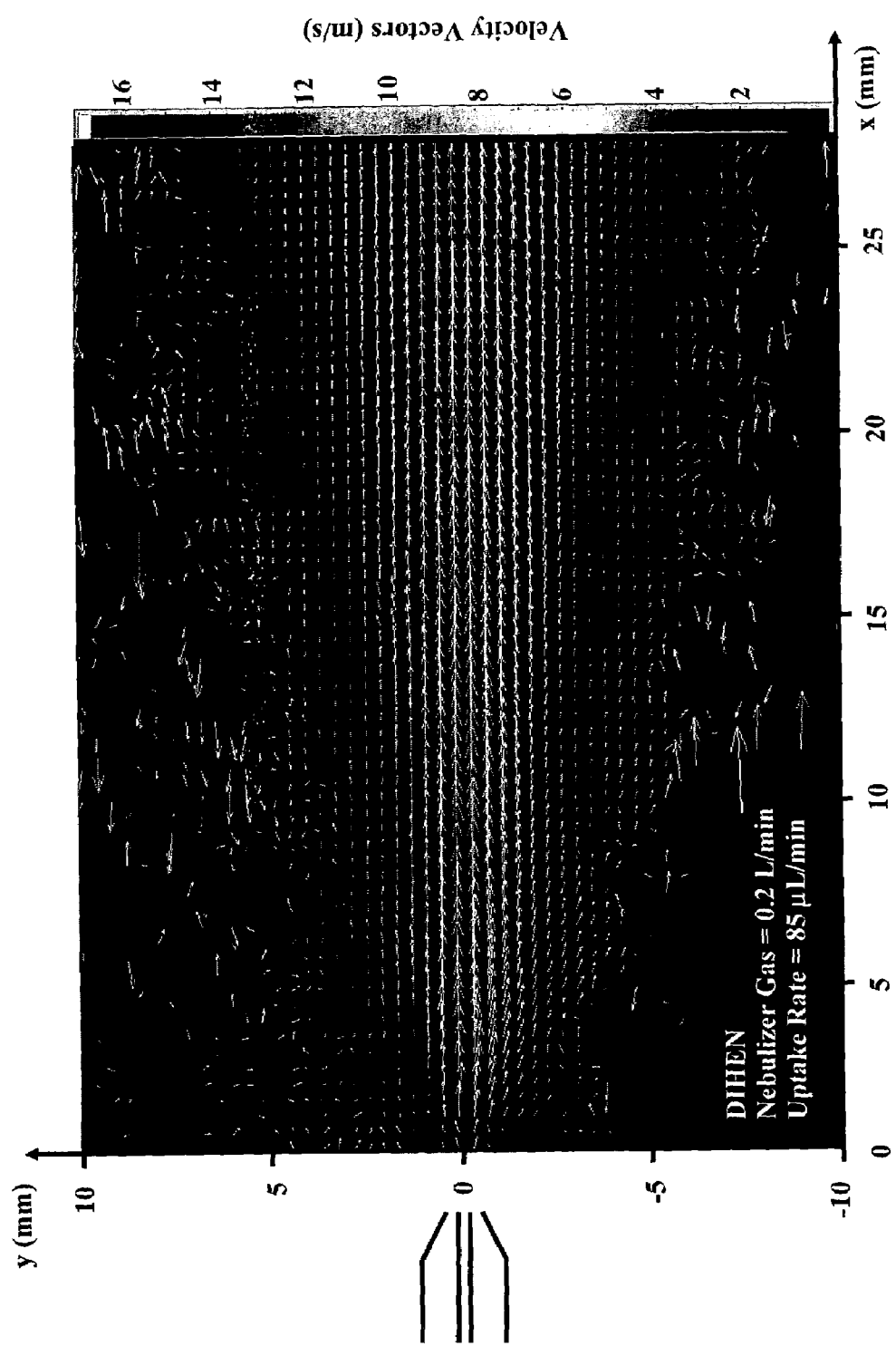

The 2-D velocity field of the aerosol produced by the DIHEN is presented in FIG. 3 for a nebulizer gas flow rate of 0.2 L/min. The direction and the size (color) of the arrows represent the direction and magnitude of the velocity vectors, respectively. Velocity vectors are highly oriented in the x direction, especially near the center of the aerosol cone as expected from the nebulizer gas flow field. Nevertheless, a number of vectors are noted near the fringes of the aerosol cone and closer to the nebulizer nozzle, revealing a noticeable y component of the velocity (Vy). Droplets with high Vy values are more likely to enter the Eddy current region of the ICP, reducing signal level, increasing noise in analytical measurements, plasma cooling, and matrix effects. Because the majority of the vectors have a negligible Vy value and the residence time of the droplets in the ICP is proportional to velocities in the x direction, only the x component of the velocity field (Vx) is studied. The outlier vectors are attributed to the noise in the PIV measurements or the particles' movement in the ambient air.

Figure 4:
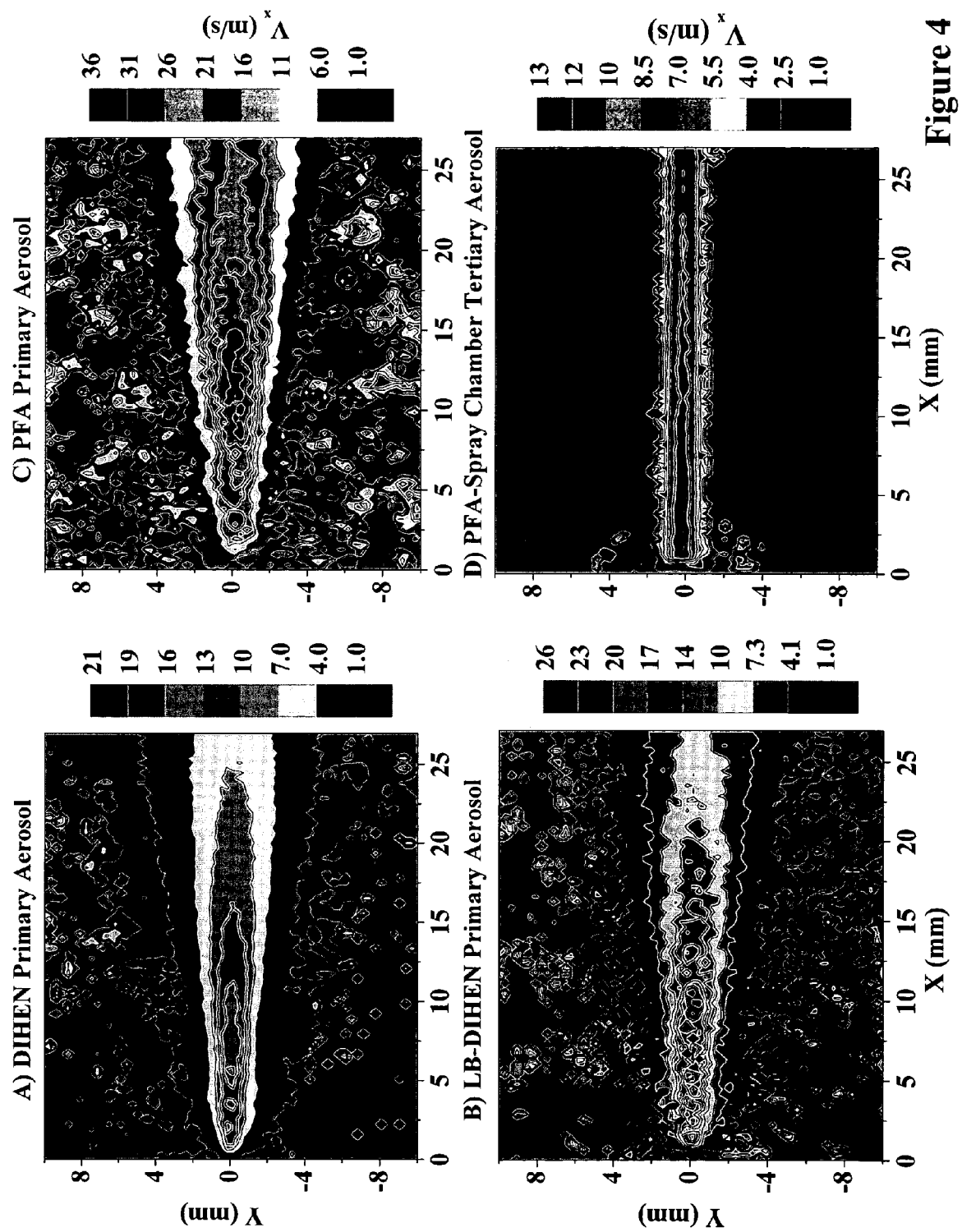

Axial velocity maps for three nebulization systems under typical operating conditions are illustrated in FIG. 4. The nebulizer nozzle is located at (xy)=(0,0). As discussed in the experimental section, PIV provides an average value for the velocity vectors. For the DIHEN and LB-DIHEN aerosol (FIGS. 4A and 4B, respectively), the average velocity increases to its maximum at about 5-10 mm from the nebulizer tip, but decreases thereafter. This behavior is attributed to the drag force exerted by the nebulizer gas flow. The drag force accelerates the droplets as they emerge from the capillary tip. The magnitude of the force decreases because the difference in velocity between the gas and the droplets is continuously decreasing. For the PFA nebulizer (FIG. 4C), a nebulizer gas flow rate of 0.9 L/min must be used which increases the magnitude of the velocities shifting the maximum velocity region further downstream (10-15 mm). Again, for all nebulization systems tested, lower-velocity droplets travel on the fringes of the aerosol cone while the center of the cone consists of much faster aerosol. These slower droplets often collide with each other, leading to droplet coalescence, i.e., larger droplets.[11] Clearly, not all drop collisions will result in coalescence; reflexive and stretching separation may also occur.

The velocity field of the PFA tertiary aerosol is shown in FIG. 4D as droplets emerge from the torch injector tube (i.d.=2 mm). Compared to the primary aerosol (FIG. 4C), the droplets are: 1) more confined near the center; 2) substantially slower (maximum velocity=~10 m/s); and 3) exhibit relatively uniform velocities. The first two points are linked to the wide i.d. of the injector tube, which creates a laminar flow with low velocity values near the edges of the aerosol passageway and a maximum in the center.

The $D_{3,2}$ distribution of the droplets is presented in FIGS. 5A, 5B, 5C and 5D for the DIHEN, LB-DIHEN, PFA primary, and PFA tertiary aerosol, respectively. The center of the primary aerosol cone comprises smaller droplets while larger droplets travel on the fringes. As noted earlier, considering the lower velocity of the droplets near the fringes of the cone (FIG. 4), the creation of these large and slow droplets cannot be avoided because of droplet coalescence and also inadequate gas-liquid interactions in this region. The presence of very large droplets (30 μm and larger) near the tip of the nozzle is noteworthy. For the PFA nebulizer, which is normally coupled to a spray chamber, such large droplets are removed by the spray chamber, resulting in low transport efficiency. However, in direct injection nebulization, these droplets are directly introduced into the ICP and consequently, result in plasma instabilities and noise in the analytical measurement. It should be noted that the primary aerosol from the DIHEN ($D_{3,2}$ at 15 mm from the nozzle=8.5 μm) is finer compared to the PFA ($D_{3,2}$=12.9 μm).

Figure 5:
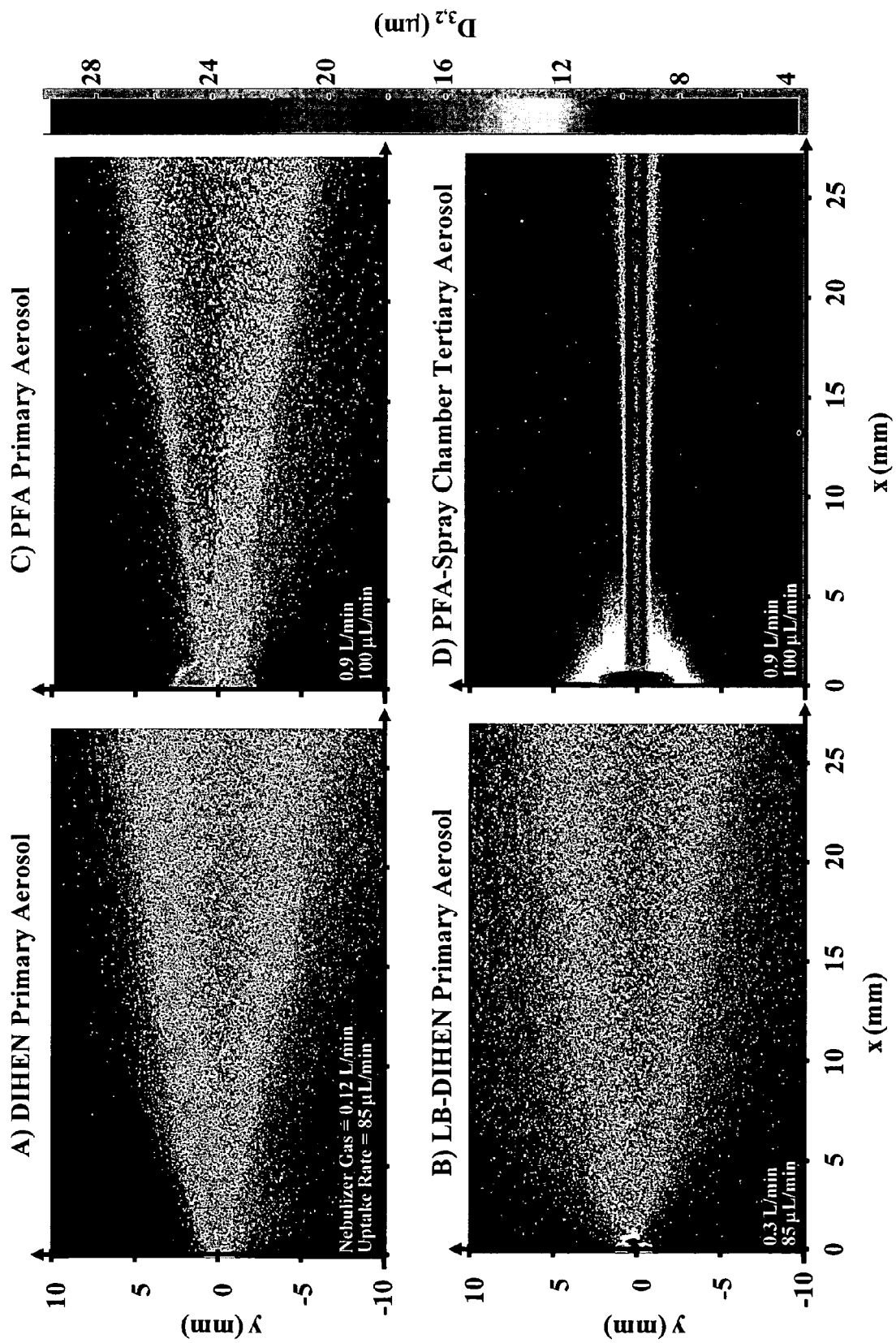

FIG. 5D shows the tertiary aerosol for the PFA-spray chamber arrangement. A narrow size distribution is observed throughout the major portion of the aerosol pattern. More importantly, the droplets are completely confined within a 2-3 mm-wide channel indicating efficient transfer to the axial channel of the ICP to produce an analytical signal, due to the torch injector tube geometry. The tertiary aerosol also contains some large droplets on the fringes of the spray. Comparing FIG. 5D and FIG. 4D, it should be noted that slow droplets coalesce, creating larger droplets, following a mechanism similar to that discussed for the primary aerosol. FIGS. 4D and 5D collectively suggest that the spray chamber and the torch injector tube act as a momentum filter (momentum=mass×velocity) rather than a size filter. In short, the chamber reduces both the size and velocity of the primary aerosol by removing large and fast droplets and directing them into the drain. This finding, as discussed later, may be used to develop smart, tunable nebulizers that create nearly the same aerosol properties as the sample concentration or matrix type is changed.

Figure 6:
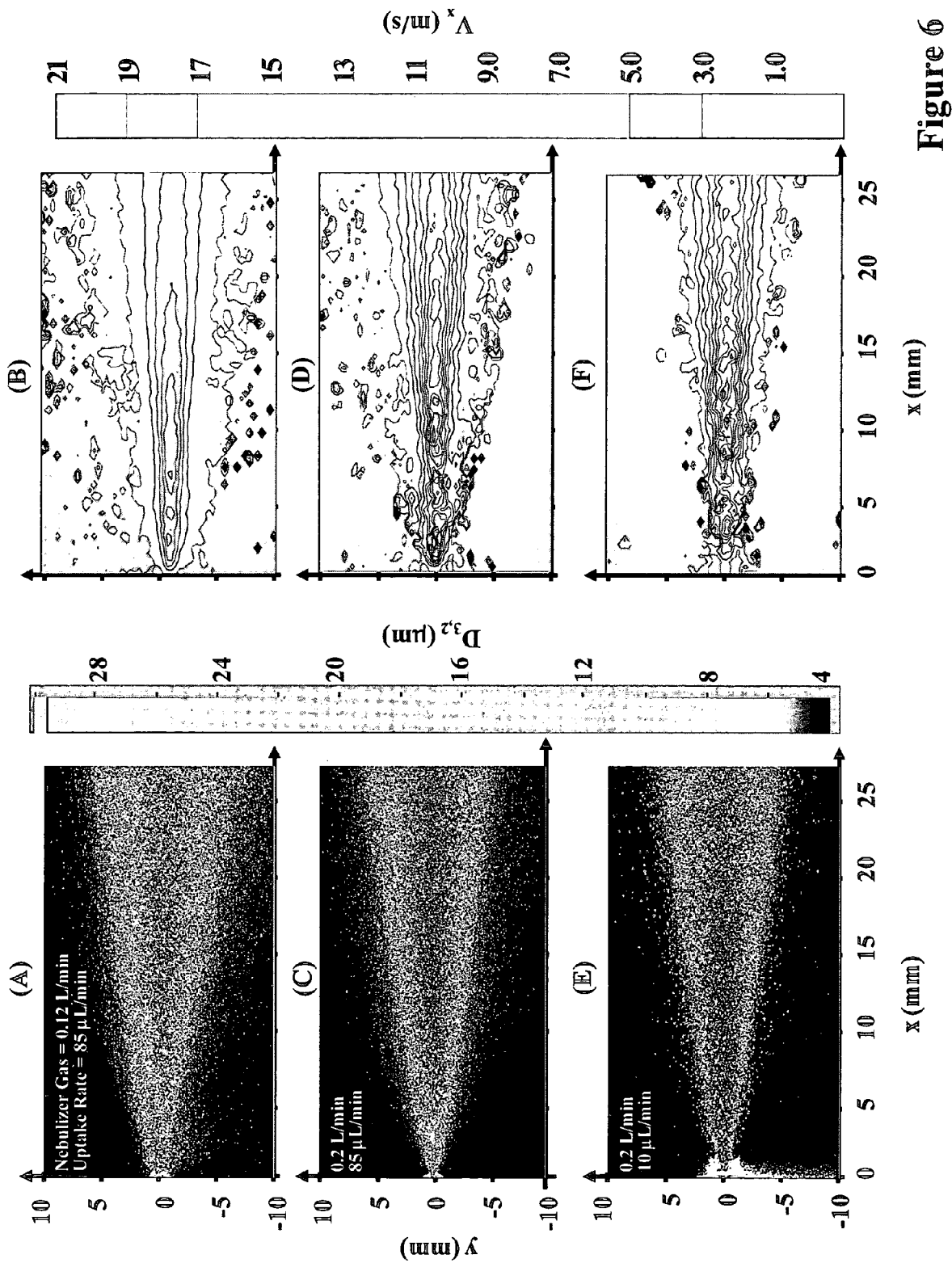

The effect of gas and solution flow rates on the 2-D size and velocity distribution of the DIHEN primary aerosol is illustrated in FIG. 6. Increasing the nebulizer gas flow rate from 0.12 (FIGS. 6A and 6B) to 0.2 L/min (FIGS. 6C and 6D) alters the size and velocity distributions of the droplets. The central region with smaller droplets expands as a result of stronger gas-liquid interactions at higher gas flow rates. The number of larger droplets on the fringes of the aerosol cone and the aerosol cone angle also decrease as the nebulizer gas flow rate is raised. It should be noted that the velocity contours (FIGS. 6B and 6D) indicate a shift in the maximum droplet velocity to higher x values. The high velocity of the droplets and the cooling effect of the nebulizer gas account for the reduced sensitivity in the ICPMS measurements when the DIHEN is operated at 0.2 L/min or higher flow rate. Thus, operating the DIHEN at high nebulizer gas flows such as 0.9 L/min[48] is not recommended as the best sensitivity and detection limit are not realized. Importantly, fast droplets experience a shorter residence time in the ICP and are not fully desolvated. Such incompletely desolvated droplets are a major source of noise and signal loss in the ICP spectrometries.

Decreasing the solution uptake rate to 10 μL/min (FIGS. 6E and 6F), reduces the droplet size near the nebulizer nozzle. This observation is again attributed to the stronger interactions between the gas and liquid streams. However, the velocity contours, and the maximum velocity region remain relatively unaffected compared to when a solution uptake rate of 85 μL/min is used (FIG. 6D), indicating that the nebulizer gas flow rate determines the velocity of droplets.

Figure 7:
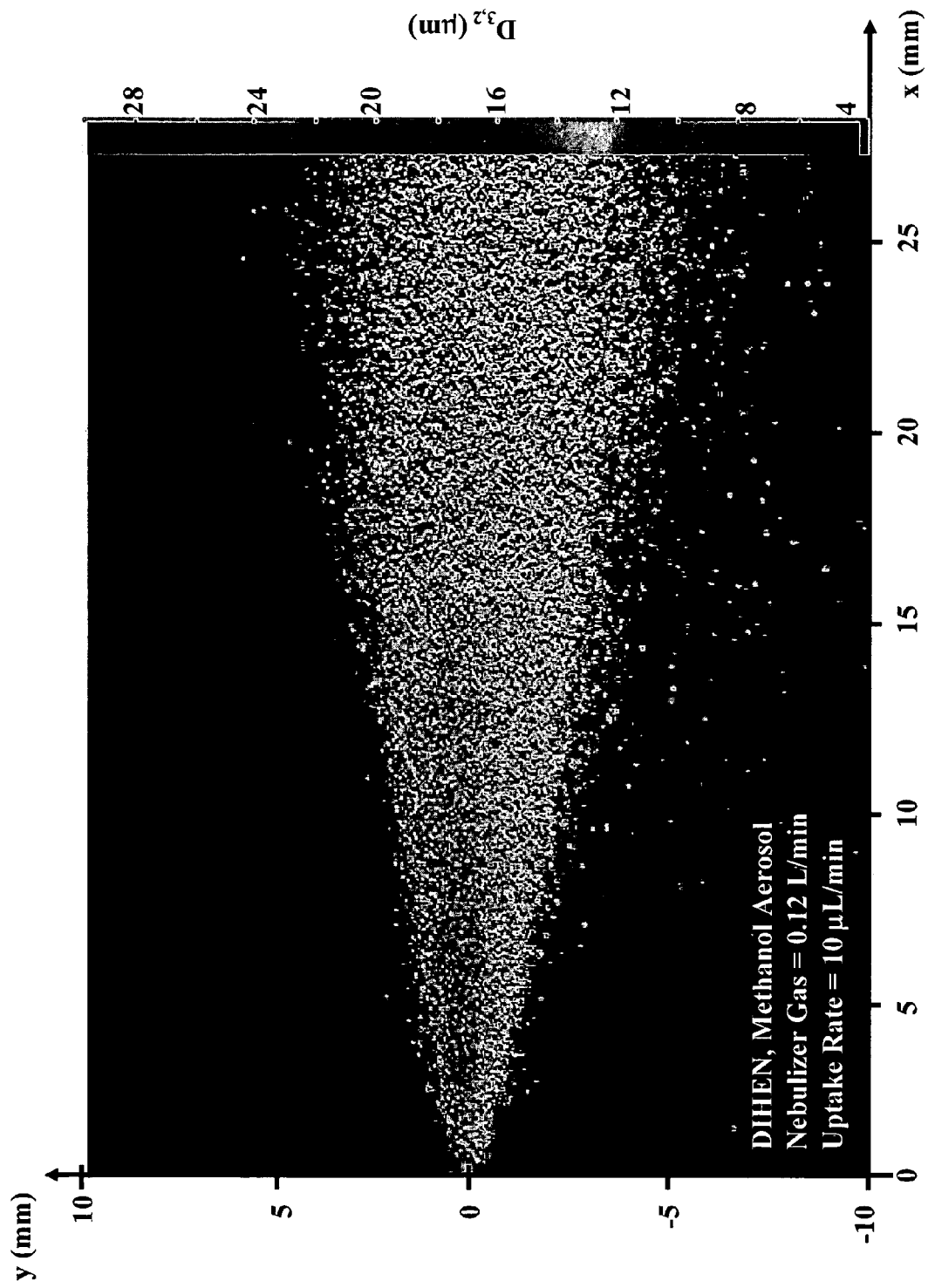

The above data are obtained for aqueous samples. The aerosol size is dramatically reduced for nebulization of organic solvents.[49] The size distribution of methanol aerosol produced by the DIHEN is illustrated in FIG. 7 for a solution uptake rate of 10 μL/min and a nebulizer gas flow rate of 0.12 L/min. Compared to the aqueous aerosol (FIG. 6), the droplets are much smaller, with a $D_{3,2}$ of 6.1 μm at 15 mm away from the nozzle, and exhibit a more uniform distribution, especially near the nozzle. The number of droplets that are larger than 15 μm and are clearly visible on the fringes of the aqueous aerosol cone (FIG. 6) is also reduced.

Certain exemplary embodiments of the present invention may be used to develop a smart, tunable nebulizer that generates uniform aerosol properties for the introduction of various samples and matrices into the ICP, with a possibility to reduce sample introduction-associated matrix effects in plasma spectrometries. For example, instantaneous measurement of droplet size and velocity can offer the droplet momentum as a feedback control for adjusting the nebulizer (the nebulizer operating conditions and/or its critical dimensions) or the plasma conditions.

The description of the exemplary embodiments of the present invention is intended to be illustrative, and not to limit the scope of the invention which is defined by the claims and their equivalents. Many alternatives, modifications, and variations will be apparent to those skilled in the art and are intended to be included within the scope of the appended claims and equivalents thereof.

REFERENCES

[1] A. Montaser, Ed. *Inductively Coupled Plasma Mass Spectrometry*; VCH-Wiley: New York, (1998), 964 Pages.

[2] A. Montaser, D. W. Golightly, Eds. *Inductively Coupled Plasmas in Analytical Atomic Spectrometry*, 2nd ed.; VCH-Wiley: New York, (1992), 1017 Pages.

[3] A. Montaser, M. G. Minnich, H. Liu, A. G. T. Gustavsson, R. F. Browner, Fundamental Aspects of Sample Introduction in ICP Spectrometry. In *Inductively Coupled Plasma Mass Spectrometry*; Montaser, A., Ed.; VCH-Wiley: New York, (1998).

[4] A. Montaser, M. G. Minnich, J. A. McLean, H. Liu, J. A. Caruso, C. W. McLeod, Sample Introduction in ICPMS. In *Inductively Coupled Plasma Mass Spectrometry*; A. Montaser, Ed.; VCH-Wiley: New York, (1998).

[5] J. A. McLean, M. G. Minnich, L. A. Iacone, H. Liu, and A. Montaser, Nebulizer Diagnostics: Fundamental Parameters, Challenges, and Techniques on the Horizon, *J. Anal. At. Spectrom.* 13, 829-842 (1998).

[6] J. W. Olesik, Fundamental Research in ICP-OES and ICPMS, *Anal. Chem.* 68, 469A-474A (1996).

[7] B. L. Sharp, Pneumatic Nebulizers and Spray Chambers for Inductively Coupled Plasma Spectrometry, A Review: Part 1. Nebulizers, *J. Anal. At. Spectrom.* 3, 613-652 (1988).

[8] B. L. Sharp, Pneumatic Nebulizers and Spray Chambers for Inductively Coupled Plasma Spectrometry, A Review: Part 2. Spray Chambers, *J. Anal. At. Spectrom.* 3, 939-963 (1988).

[9] R. F. Browner, "Fundamental Aspects of Aerosol Generation and Transport" in Inductively Coupled Plasma Emission Spectroscopy, Part II. *Applications and Fundamentals*, P. W. J. M. Boumans, Ed.; John Wiley & Sons: New York, (1987).

[10] C. M. Benson, S. F. Gimelshein, D. A. Levin, and A. Montaser, Simulation of Droplet Heating, Desolvation, and Motion in Inductively Coupled Plasma, *Spectrochim. Acta B* 56, 1097-1112 (2001).

[11] C. M. Benson, S. F. Gimelshein, D. A. Levin, J. Zhong, and A. Montaser, Simulation of Droplet Heating and Desolvation in an Inductively Coupled Plasma—Part II: Coalescence in the Plasma, Spectrochim. Acta B 58, 1453-1471 (2003).

[12] J. Horner, S. A. Lehn, G. M. Hieftje, Computerized Simulation of Aerosol-Droplet Desolvation in an Inductively Coupled Plasma, *Spectrochim. Acta B* 57, 1025-1042 (2002), and References therein.

[13] S. Nukiyama, Y. Tanasawa, *Trans. Soc. Mech. Eng., Tokyo* 4, 5, and 6, 1938-1940 (Translated by E. Hope, "Experiments on the Atomization of Liquids in an Air Stream", Defense Research Board, Dept. of National Defense; Ottawa, Canada, 1950).

[14] R. F. Browner, A. W. Boom, D. D. Smith, Aerosol Transport Model for Atomic Spectrometry, *Anal. Chem.* 54, 1411-1419 (1982).

[15] A. Gustavsson, Mathematical Model for Concentric Nebulizer Systems, *Anal. Chem.* 55, 94-98 (1983).

[16] A. Canals, V. Hemandis, R. F. Browner, Experimental Evaluation of the Nukiyama-Tanasawa Equation for Pneumatic Nebulizers Used in Plasma Atomic Emission Spectrometry, *J. Anal. At. Spectrom.* 5, 61-66 (1990).

[17] R. H. Clifford, I. Ishii, A. Montaser, G. A. Meyer, Dual-Beam Light-Scattering Interferometry for Simultaneous Measurements of Droplet-Size and Velocity Distributions of Aerosols from Commonly Used Nebulizers, *Anal. Chem.* 62, 390-394 (1990).

[18] R. H. Clifford, P. Sohal, H. Liu, A. Montaser, Diagnostic Studies on Desolvated Aerosol from Ultrasonic Nebulizers, *Spectrochim. Acta B* 47, 1107-1122 (1992).

19 H. Liu, A. Montaser, Phase-Doppler Diagnostic Studies of Primary and Tertiary Aerosols Produced by a New High-Efficiency Nebulizer, *Anal. Chem.* 66, 3233-3242 (1994).

[20] J. W. Olesik, J. C. Fister III, Incompletely Desolvated Droplets in Argon Inductively Coupled Plasmas Their Number, Original Size and Effect on Emission Intensities, *Spectrochim. Acta B* 46, 851-868 (1991).

[21] J. W. Olesik, Investigating the Fate of Individual Sample Droplets in Inductively Coupled Plasmas, *Appl. Spectrosc.* 51, 158A-175A (1997).

[22] W. D. Bachalo, Experimental Methods in Multiphase Flows, *Int. J Multiphase Flow*, 20, 261-295 (1994).

[23] R. H. Clifford, A. Montaser, S. A. Sinex, S. G. Capar, Thimble Glass Frit Nebulizer for Atomic Spectrometry, *Anal. Chem.* 61, 2777-2784 (1989).

[24] N. Mohamed, R. C. Fry, D. L. Wetzel, Laser Fraunhofer Diffraction Studies of Aerosol Droplet Size in Atomic Spectrochemical Analysis, *Anal. Chem.* 53, 639-645 (1981).

[25] A. Canals, J. Wagner, R. F. Browner, V. Hemandis, Empirical Model for Estimating Drop Size Distributions of Aerosols Generated by Inductively Coupled Plasma Nebulizers, *Spectrochim. Acta B* 43, 1321-1335 (1988).

[26] J. W. Olesik, L. C. Bates, Characterization of Aerosols Produced by Pneumatic Nebulizers for Inductively Coupled Plasma Sample Introduction: Effect of Liquid and Gas Flow Rates on Volume Based Drop Size Distributions, *Spectrochim. Acta B* 50, 285-303 (1995).

[27] H. Liu, R. H. Clifford, S. P. Dolan, A. Montaser, Investigation of a High-Efficiency Nebulizer and a Thimble Glass Frit Nebulizer for Elemental Analysis of Biological Materials by Inductively Coupled Plasma-Atomic Emission Spectrometry, *Spectrochimica Acta B* 51, 27-40 (1996).

[28] H. Liu, A. Montaser, S. P. Dolan, R. S. Schwartz, Evaluation of a Low Sample Consumption, High-Efficiency Nebulizer for Elemental Analysis of Biological Samples Using Inductively Coupled Plasma Mass Spectrometry, *J. Anal. At. Spectrom.* 11, 307-311 (1996).

[29] J. A. McLean, M. G. Minnich, J. Su, W. Lai, A. Montaser, Optical Patternation: A Technique for Three-Dimensional Aerosol Diagnostic, *Anal. Chem.* 72, 4796-4804 (2000).

[30] M. G. Minnich, J. A. McLean, J. A. Montaser, Spatial Aerosol Characteristics of a Direct Injection High Efficiency Nebulizer via Optical Patternation, *Spectrochim. Acta B* 56, 1113-1126 (2001).

[31] J. A. McLean, H. Zhang, A. Montaser, A Direct High Efficiency Nebulizer for Inductively Coupled Plasma Mass Spectrometry, *Anal. Chem.* 70, 1012-1020 (1998).

[32] B. W. Acon, J. A. McLean, A. Montaser, A Large Bore Direct Injection High Efficiency Nebulizer for Inductively Coupled Plasma Spectrometry, *Anal. Chem.* 72, 1885-1893 (2000).

[33] C. S. Westphal, K. Kahen, W. F. Rutkowski, B. W. Acon, A. Montaser, Demountable Direct Injection High Efficiency Nebulizer for Inductively Coupled Plasma Mass Spectrometry, *Spectrochim. Acta B,* 59, 353-368 (2004).

[34] R. J. Adrian, Scattering Particle Characteristics and Their Effect on Pulsed Laser Measurements of Fluid Flow: Speckle Velocimetry vs. Particle Image Velocimetry, *Appl. Opt.* 23, 1690-1691 (1984).

[35] R. J. Adrian, Image Shifting Technique to Resolve Directional Ambiguity in Double-Pulsed Velocimetry, *Appl. Opt.* 25, 3855-3858 (1986).

[36] C. C. Landreth, R. J. Adrian, Electrooptical Image Shifting for Particle Image Velocimetry, *Appl. Opt.* 27, 4216-4220 (1988).

[37] R. J. Adrian, Doubled Exposure Multiple-Field Particle Image Velocimetry for Turbulent Probability Density, *Optics and Lasers in Engineering* 9, 211-228 (1988).

[38] L. M. Lourenco, A. Korthapalli, The Role of Photographic Parameters in Laser Speckle or Particle Image Displacement Velocimetry, *Exp. Fluids* 5, 29-42 (1995).

[39] S. T. Wereley, R. M. Lueptow, Spatio-Temporal Character of Non-Wavy and Wavy Taylor-Couette Flow, *J. Fluid Mech.* 364, 59-80 (1998).

[40] E. Thomas, Direct Measurements of Two-Dimensional Velocity Profiles in Direct Current Glow Discharge Dusty Plasmas, *Phys. Plasmas* 6, 2672-2675 (1999).

[41] R. D. Keane, R. J. Adrian, Theory of Cross-Correlation Analysis of PIV Images, *Appl. Sci. Res.* 49, 19-215 (1992).

[42] R. D. Keane, R. J. Adrian, Optimization of Particle Image Velocimeters. I. Double Pulsed Systems *Meas. Sci. Technol.* 1, 1202-1215 (1990).

[43] H. C. Van de Hulst, Rigorous Scattering Theory for Spheres of Arbitrary Size (Mie Theory). In Light Scattering by Small Particles; H. C. Van de Hulst; Wiley: New York, (1957).

[44] R. Domann, Y. Hardalupas, Quantitative Measurement of Planar Droplet Sauter Mean Diameter in Sprays Using Planar Droplet Sizing, Presented at the 11*th International Symposium on Application of Laser Techniques to Fluid Mechanics*, Lisbon, Portugal, (July 2002).

[45] M. C. Jermy, D. A. Greenhalgh, Planar Dropsizing by Elastic and Fluorescence Scattering in Sprays too Dense for Phase Doppler Measurement, *Appl. Phys. B* 71, 703-710 (2000).

[46] W. D. Bachalo, Method for Measuring the Size and Velocity of Spheres by Dual-Beam Light-Scatter Interferometry, *Appl. Opt.* 19, 363-370 (1980).

[47] A. Montaser, J. A. McLean, J. M. Kacsir, A Novel Direct Injection High Efficiency Nebulizer for Atomic Spectroscopy, U.S. Pat. No. 6,166,379 (2000).

[48] A. J. Baca, A. B. De La Ree, F. Zhou, A. Z. Mason, Anodic Stripping Voltammetry Combined On-Line with Inductively Coupled Plasma-MS via a Direct-Injection High-Efficiency Nebulizer, Anal. Chem. 75, 2507-2511 (2003).

[49] A. W. Boom, R. F. Browner, Effects of Organic Solvents in Inductively Coupled Plasma Atomic Emission Spectrometry, *Anal. Chem.* 54, 1402-1410 (1982).

[50] K. Jorabchi, K. Kahen, C. Gray, A. Montaser, In-situ Visualization and Characterization of Aerosol Droplets in an Inductively Coupled Plasma, to be submitted to *Anal. Chem.* 77, 1252-1260 (2005).

[51] B. Lazaro, D. Peinado, M. Vega, A. Lecuona, P. Rodriguez, A. Jasuja, F. Liousse, Laser Scattering Patternator: A Novel Technique for the Measurement of Industrial, Optically Dense Sprays, Presented at the *9th International Conference on Liquid Atomization and Spray Systems*, Sorrento, Italy, (2003).

We claim:

1. A feedback mechanism comprising:
    an analytical system for performing an evaluation of at least one property of at least one of droplets, particles and aerosol, the analytical system comprising a laser light delivery system configured to deliver at least two laser pulses to the at least one of droplets, particles and aerosol; and
    a feedback signal generator for generating a feedback signal based on the evaluation performed by the analytical system, the feedback signal facilitating optimization of at least one operational parameter of a source of the at least one of droplets, particles and aerosol;
    wherein a scattering of the at least two laser pulses from the at least one of droplets, particles and aerosol is captured to provide two substantially instantaneous images thereof, and pointwise cross-correlation of corresponding images yields two-dimensional velocity map of a flow field of the at least one of droplets. particles and aerosol.

2. The feedback mechanism as claimed in claim 1, wherein the at least one property comprises at least one of velocity, size, viscosity, or density.

3. The feedback mechanism as claimed in claim 1, wherein the source comprises at least one of a nebulizer or a nozzle.

4. The feedback mechanism as claimed in claim 3, wherein the nebulizer comprises a direct injection nebulization configuration.

5. The feedback mechanism as claimed in claim 3. wherein the nebulizer comprises a nebulizer-spray chamber.

6. The feedback mechanism as claimed in claim 3, wherein the nozzle comprises a fuel injector or an inhaler.

7. The feedback mechanism as claimed in claim 1, wherein the analytical system comprises at least one of a two laser-based imager, a phase Doppler particle analyzer (PDPA) and a viscometer.

8. The feedback mechanism as claimed in claim 1, wherein the analytical system further comprises:
    a detector for capturing at least one of a scattering of the laser pulses from the at least one of droplets, particles and aerosol, and a fluorescence from the at least one of droplets, particles and aerosol; and
    an image acquisition unit for receiving and processing data from the detector.

9. The feedback mechanism as claimed in claim 8, wherein the laser light delivery system comprises:
    a dual cavity frequency-doubled Nd: YAG pulsed laser;
    a mirror; and
    a cylindrical lens;
    wherein the dual cavity frequency-doubled Nd: YAG pulsed laser, the mirror and the cylindrical lens are configured to generate a laser sheet.

10. The feedback mechanism as claimed in claim 8, wherein the detector comprises a first charge coupled detector (CCD) arranged in a first optical path of the laser pulses scattered from the at least one of droplets, particles and aerosol.

11. The feedback mechanism as claimed in claim 8, wherein the detector further comprises a second charge coupled detector (CCD) arranged in a second optical path of the laser pulses to capture the fluorescence from the at least one of droplets, particles and aerosol, wherein the detector and the laser light delivery system are synchronized, and wherein the first and second CCDs capture an image essentially simultaneously.

12. The feedback mechanism as claimed in claim 11, wherein the detector further comprises:
    a narrow band-pass filter configured in the first optical path between the first CCD and the at least one of droplets, particles and aerosol; and
    a high-pass filter configured in the second optical path between the second CCD and the at least one of droplets, particles and aerosol.

13. A method for generating feedback comprising:
    deliver at least two laser pulses to the at least one of droplets. particles and aerosol performing an evaluation of at least one property of the at least one of droplets, particles and aerosol including capturing a scattering of the at least two laser pulses from the at least one of droplets, particles and aerosol to provide two substantially instantaneous images thereof. wherein pointwise cross-correlation of corresponding images yields two-dimensional velocity map of a flow field of the at least one of droplets. particles and aerosol; and
    generating a feedback signal based on the evaluation, the feedback signal facilitating optimization of at least one operational parameter of a source of the at least one of droplets, particles and aerosol.

14. The method as claimed in claim 13, wherein the at least one property comprises at least one of velocity, size, viscosity or density.

15. The method as claimed in claim 13, wherein the source comprises at least one of a nebulizer or a nozzle.

16. The method as claimed in claim 15, wherein the nebulizer comprises a direct injection nebulization configuration or a nebulizer-spray chamber.

17. The method as claimed in claim 15, wherein the nozzle comprises a fuel injector or an inhaler.

18. The method as claimed in claim 13, wherein the performing of the evaluation comprises utilizing at least one of Particle Image Velocimetry (PIV), phase Doppler particle analyses (PDPA) and viscosity measuring.

19. The method as claimed in claim 13, wherein the performing of the evaluation further comprises:
    processing the scattering of the laser pulses from the at least one of droplets, particles and aerosol to evaluate the at least one property of the at least one of droplets, particles and aerosol.

20. The method as claimed in claim 19, wherein the delivering at least two laser pulses to the at least one of droplets, particles and aerosol comprises generating a laser sheet.

21. The method as claimed in claim 19, wherein the capturing of the scattering of the laser pulses comprises arranging a first charge coupled detector (CCD) in a first optical path of the laser pulses scattered from the at least one of droplets, particles and aerosol.

22. The method as claimed in claim 21, wherein the performing of the evaluation further comprises:

capturing a fluorescence from the at least one of droplets, particles and aerosol; and processing the fluorescence from the at least one of droplets, particles and aerosol to evaluate the at least one property of the at least one of droplets, particles and aerosol.

23. The method as claimed in claim 22, wherein the capturing of the fluorescence comprises arranging a second charge coupled detector (CCD) in a second optical path of the fluorescence from the at least one of droplets, particles and aerosol.

24. The method as claimed in claim 23, wherein the capturing of the scattering of the laser pulses further comprises configuring a narrow band-pass filter in the first optical path between the first CCD and the at least one of droplets, particles and aerosol; and wherein the capturing of the fluorescence further comprises configuring a high-pass filter in the second optical path between the second CCD and the at least one of droplets, particles and aerosol.

25. The method as claimed in claim 21, wherein the performing of the evaluation comprises:
recording the scattering of the laser pulses comprising two consecutive images of the at least one of droplets, particles and aerosol;
dividing the two images into at least two interrogation boxes of m x n pixels, wherein m and n are positive integers;
calculating a two-dimensional velocity vector;
assessing an average displacement of the at least one of droplets, particles and aerosol via cross-correlation of the at least two interrogation boxes, wherein a cross-correlation function (Rfg) is defined as $$R_{fg}(i, j) = f(i, j) \otimes g(i, j) = \sum_{x=0}^{m-1} \sum_{y=0}^{n-1} f(x, y) g(x - i, y - j),$$

where f and g are functions corresponding to the at least two interrogation boxes, respectively, in the cross-correlation, g is shifted i and j pixels, i and j being positive integers, in the x and y directions, respectively;

wherein an overlap between the resulting function and f determines a value of the cross-correlation function Rfg (i,j), a position of the maximum in Rfg (ij) provides a displacement vector during at time period $\Delta t$, resulting in the velocity vector for a particular one of the at least two interrogation boxes.

26. The method as claimed in claim 25, wherein the velocity profile of flow field is reconstructed from individual velocity vectors for the at least two interrogation boxes across the field.

27. The method as claimed in claim 26, wherein the reconstruction is obtained when the at least two interrogation boxes are defined with a 50% area overlap.

28. The method as claimed in claim 21, wherein two-dimensional velocity fields are measured through Mie scattering.

29. The method as claimed in claim 23, wherein a three-dimensional velocity field is obtained by positioning the first and second CCDs at an angle with respect to each other covering approximately a same field of view, and by reconstructing a z component of the velocity vector, the z component being perpendicular to the laser sheet, two two-dimensional velocity fields observed by the first and second CCDs, respectively, and the x and y components of the two-dimensional velocity fields.

30. A self-optimizing system comprising:
a feedback mechanism as claimed in claim 1;

a controller configured to receive the feedback signal; and a source of the at least one of droplets, particles and aerosol;

wherein the controller adjusts the at least one operational parameter of the source based on the feedback signal.

31. The self-optimizing system as claimed in claim 30,wherein the source comprises a nebulizer, the nebulizer comprising a capillary having adjustable dimensions.

32. The self-optimizing system as claimed in claim 31, wherein the capillary comprises a ceramic, whereby the dimensions of the capillary are adjustable by the controller in response to a voltage applied to the capillary.

33. A method for optimizing a source of at least one of droplets, particles and aerosol, the method comprising:

delivering at least two laser pulses to the at least one of droplets. particles and aerosol performing an evaluation of at least one property of at least one of droplets, particles and aerosol including capturing a scattering of the at least two laser pulses from the at least one of droplets, particles and aerosol to provide two substantially instantaneous images thereof, wherein pointwise cross-correlation of corresponding images yields two-dimensional velocity map of a flow field of the at least one of droplets, particles and aerosol;

generating a feedback signal based on the evaluation; and optimizing at least one operational parameter of a source of the at least one of droplets, particles and aerosol based on the feedback signal.

34. The method as claimed in claim 33, wherein the performing of the evaluation comprises evaluating a momentum of the at least one of droplets, particles and aerosol, and wherein the feedback signal is generated based on the momentum.

* * * * *